United States Patent
Wang

(10) Patent No.: US 12,328,779 B2
(45) Date of Patent: Jun. 10, 2025

(54) METHODS AND APPARATUS FOR SIDELINK RELAY CHANNEL ESTABLISHMENT

(71) Applicant: MediaTek Singapore Pte. Ltd., Singapore (SG)

(72) Inventor: Xuelong Wang, Beijing (CN)

(73) Assignee: MEDIATEK Singapore Pte. Ltd, Singapore (SG)

( * ) Notice: Subject to any disclaimer, the term of this patent is extended or adjusted under 35 U.S.C. 154(b) by 376 days.

(21) Appl. No.: 17/814,174

(22) Filed: Jul. 21, 2022

(65) Prior Publication Data

US 2022/0361267 A1    Nov. 10, 2022

Related U.S. Application Data

(63) Continuation of application No. PCT/CN2021/073230, filed on Jan. 22, 2021, which
(Continued)

(51) Int. Cl.
*H04W 88/04*    (2009.01)
*H04W 76/14*    (2018.01)

(52) U.S. Cl.
CPC ............ *H04W 76/14* (2018.02); *H04W 88/04* (2013.01)

(58) Field of Classification Search
CPC ............................... H04W 76/14; H04W 88/04
(Continued)

(56) References Cited

U.S. PATENT DOCUMENTS

2017/0093541 A1    3/2017  Pan ........................... H04L 5/00
2018/0324882 A1   11/2018  Gulati ................... H04W 76/14
(Continued)

FOREIGN PATENT DOCUMENTS

CN      108029148 A     5/2018
CN      110249706       9/2019
(Continued)

OTHER PUBLICATIONS

International Search Report and Written Opinion of International Search Authority for PCT/CN2021/073230 dated Apr. 19, 2021 (8 pages).
(Continued)

*Primary Examiner* — Christopher R Crompton
(74) *Attorney, Agent, or Firm* — Helen Mao; Imperium Patent Works

(57) ABSTRACT

Apparatus and methods are provided for sidelink relay channel establishment. In one novel aspect, the relay UE channel established sidelink relay channels upon receiving sidelink relay connection request. In one embodiment, the request comes from the base station for the in-network relay UE. In another embodiment, the request comes from a remote UE requesting the service for the out-of-network relay UE. The relay UE performs the traffic relay between the two end nodes of the sidelink replay path at the L2 or at L3. In another embodiment, a specific PC5 RRC message is used to initiate the relay channel establish procedure between the relay UE and the remote UE. In another embodiment, the network sends the configurations of the relay channel to the relay UE before the start of the procedure. The mapping between relay channel ID and the end-to-end RB index is maintained in the relay UE for bearer mapping.

18 Claims, 8 Drawing Sheets

Related U.S. Application Data is a continuation of application No. PCT/CN2020/073807, filed on Jan. 22, 2020.

(58) Field of Classification Search
USPC .......................................................... 370/315
See application file for complete search history.

(56) References Cited

U.S. PATENT DOCUMENTS

| | | | | |
|---|---|---|---|---|
| 2019/0053215 | A1 | 2/2019 | Yu | H04B 7/155 |
| 2021/0153063 | A1* | 5/2021 | Zhang | H04W 80/02 |

FOREIGN PATENT DOCUMENTS

| | | | | |
|---|---|---|---|---|
| CN | 114762452 A | 7/2022 | | |
| WO | WO 201883381 | 5/2018 | | |
| WO | WO-2021001130 A1 * | 1/2021 | ............ | H04W 24/02 |

OTHER PUBLICATIONS

3GPP TSG-RAN WG2#89bis Tdoc R2-151148 10, Ericsson Signaling to Support UE-NW relay and Service Continuity. Apr. 2015 (Apr. 10, 2015).

China Intellectual Property Office Action notice of allowance 202180010228.7, dated Aug. 19, 2024.

3GPP tsg_ran\WG2_RL2, TSGR2_99 LG Electronics (Rapporteur),R2-1709984 "TR 36.746 v1.1.0 on Study on further enhancements to LTE Device to Device (D2D), User Equipment (UE) to network relays for nternet of Things (IoT) and wearables".

3GPP tsg_ran\WG2_RL2, Ericsson,R2-151148 "Signaling to support UE-NW relay and Service continuity".

2019 IEEE 4th International Conference on Computer and Communication Systems (ICCCS) R. Kataoka, A. Yamaguchi and H. Shinbo,Sidelink Grouping Method for Multicasting D2D Signaling essages with Considerations of Sidelink Transmission Power.

* cited by examiner

METHODS AND APPARATUS FOR SIDELINK RELAY CHANNEL ESTABLISHMENT

CROSS REFERENCE TO RELATED APPLICATIONS

This application is filed under 35 U.S.C. § 111(a) and is based on and hereby claims priority under 35 U.S.C. § 120 and § 365(c) from International Application No. PCT/CN2021/073230, titled "Methods and Apparatus of Sidelink Relay Channel Establishment," with an international filing date of Jan. 22, 2021. Internal Application No. PCT/CN2021/073230, in turn, claims priority under 35 U.S.C. § 120 and § 365(c) from International Application No. PCT/CN2020/073807, titled "Methods and Apparatus of Sidelink Relay Channel Establishment," with an international filing date of Jan. 22, 2020. This application is a continuation of International Application No. PCT/CN2021/073230. International Application No. PCT/CN2021/073230 is pending as of the filing date of this application, and the United States is an elected state in International Application No. PCT/CN2021/0723230. The disclosure of each of the foregoing documents is incorporated herein by reference.

TECHNICAL FIELD

The disclosed embodiments relate generally to wireless communication, and, more particularly, to sidelink relay channel establishment.

BACKGROUND 5G radio access technology will be a key component of the modern access network. It will address high traffic growth and increasing demand for high-bandwidth connectivity. Wireless relay in cellular networks provides extended coverage and improved transmission reliability. Long term evolution (LTE) network introduced 3GPP sidelink, the direct communication between two user equipment (UEs) without signal relay through a base station. In 3GPP New Radio (NR), sidelink continues evolving. With new functionalities supported, the sidelink offers low latency, high reliability and high throughout for device-to-device communications. Using sidelink for wireless relay provides a reliable and efficient way for traffic forwarding. The sidelink relay evolves from the ProSe UE-to-Network relay at Layer-3 (L3) to UE-to-Network relay at layer-2 (L2), which is expected to forward the traffic between the remote UE and the base station at an adaptation layer between radio link control (RLC) layer and the packet data convergency protocol (PDCP) layer. Further, the support of integrated access backhaul (IAB) is developed for the NR network to support Layer-2 based relaying operation between the UE and the base station. A backhaul adaptation protocol (BAP) layer is specified over the Uu interface(s) on top of RLC over the relaying path. The RLC channel for relaying within IAB is established before any relaying operation for UE. The existing protocol for link establishment lacks the support for the relay channel establishment.

Improvements and enhancements are required to establish sidelink relay channels to support the sidelink relay communication.

SUMMARY

Apparatus and methods are provided for sidelink relay channel establishment. In one novel aspect, the relay UE established sidelink relay channels upon receiving sidelink relay connection request. In one embodiment, the request comes from the base station/gNB for the in-network relay UE. In another embodiment, the request comes from a remote UE requesting the service for the out-of-network relay UE. The relay UE performs the traffic relay between the two end nodes of the sidelink replay path at the L2 or at L3. In one embodiment, the relay channel is a RLC channel with the configuration of RLC and MAC logic channel. Specific relay channel ID is allocated to identify a particular relay channel. In another embodiment, specific PC5 RRC message is used to initiate the relay channel establish procedure between the relay UE and the remote UE. In one embodiment, the relay UE is in the coverage of the network. The network sends the configurations of the Relay channel to the relay UE before the start of the procedure. The mapping between Relay channel ID and the end-to-end RB index is maintained in the relay UE to perform bearer mapping. In another embodiment, the relay channel is established as one or a list of SLRB(s) between the relay UE and the remote UE at layer-3 for Layer-3 based relaying operation. This relay Channel is configured as a SLRB with the configuration of SDAP, PDCP, RLC and MAC logic channel. SLRB ID is used to identify a particular Relay channel for this case.

In one embodiment, the relay UE receives a request to establish a sidelink (SL) relay path in a new radio (NR) network, wherein the sidelink relay path includes the relay UE as a relay node for two end nodes, sends one or more sidelink relay channel establishment commands to one or more UEs to establish one or more corresponding sidelink relay channels for the sidelink relay path, activates an end-to-end sidelink relay channel for the sidelink relay path upon completion of one or more sidelink relay channel establishments, and routes sidelink relay data packets between the two end nodes through the end-to-end relay channel. In one embodiment, the request to establish a sidelink relay path is a Uu radio resource control (RRC) message of Relay Channel establishment command from a gNB including a relay channel configuration of the sidelink relay path. In one embodiment, the request to establish a sidelink relay path is a PC5 resource control (RRC) message of Relay Channel Establishment Request from a remote UE end node.

This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
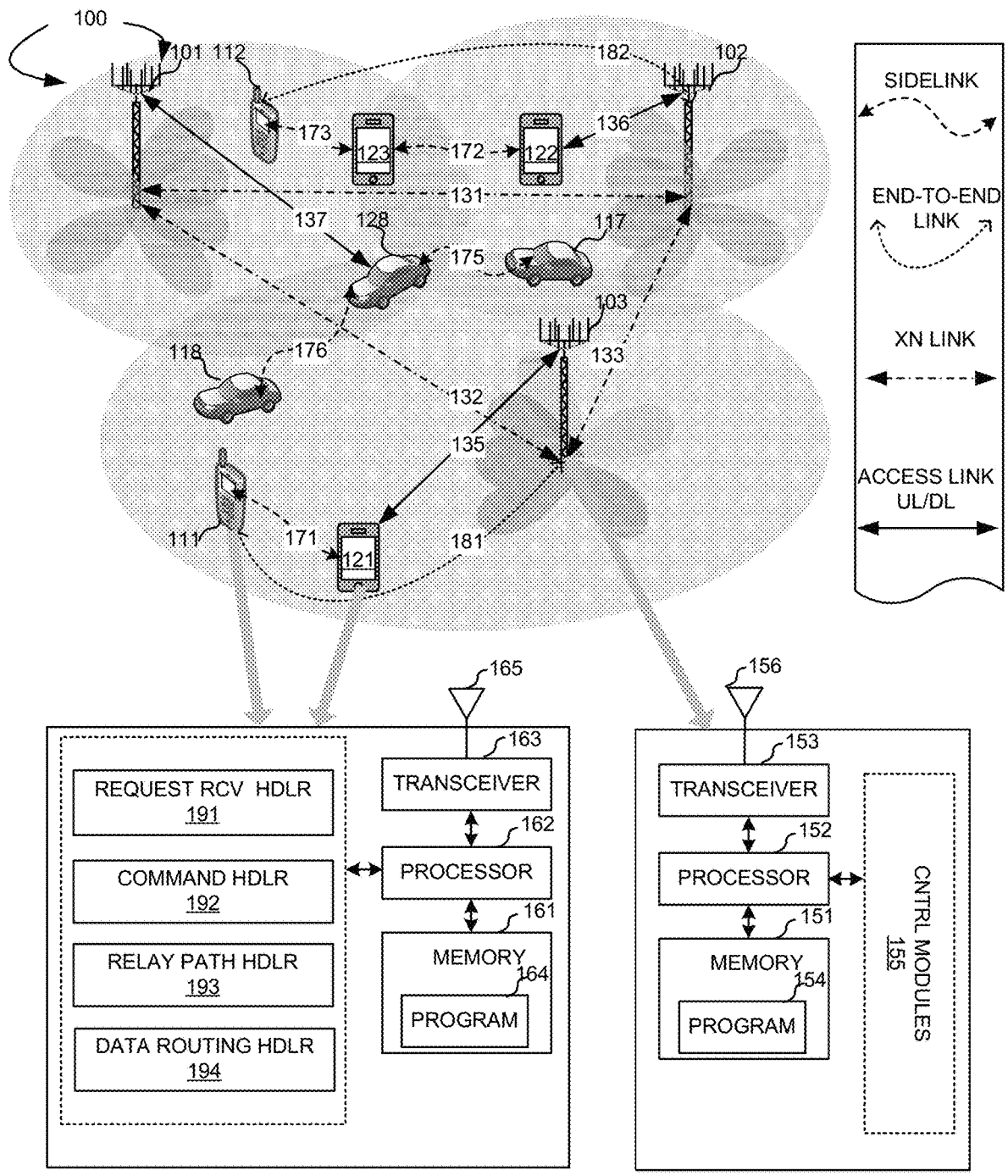
FIG. 1 is a schematic system diagram illustrating an exemplary NR wireless network for sidelink relay channel establishment in accordance with embodiments of the current invention.

FIG. 1 is a schematic system diagram illustrating an exemplary NR wireless network for sidelink relay channel establishment in accordance with embodiments of the current invention. NR wireless system 100 includes one or more fixed base infrastructure units forming a network distributed over a geographical region. The base unit may also be referred to as an access point, an access terminal, a base station, a Node-B, an eNode-B (eNB), a gNB, or by other terminology used in the art. The network can be homogeneous network or heterogeneous network, which can be deployed with the same frequency or different frequency. gNB 101, gNB 102 and gNB 103 are base stations in the NR network, the serving area of which may or may not overlap with each other. Backhaul connections such as 131, 132, and 133, connect the non-co-located receiving base units, such as gNB 101, 102 and 103. These backhaul connections can be either ideal or non-ideal. gNB 101 is connected with gNB 102 via Xnr interface 131 and is connected with gNB 103 via Xnr interface 132. gNB 102 is connected with gNB 103 via Xnr interface 133.

Wireless network 100 also includes multiple communication devices or mobile stations, such user equipments (UEs) such as UEs 111, 112, 113, 117, 118, 121, 122, 123, and 128. Communication devices or mobile stations in wireless network 100 may also refers to devices with wireless connectivity in a vehicle, such as mobile devices 118, 117 and 128. The exemplary mobile devices in wireless network 100 have sidelink capabilities. The mobile devices can establish one or more connections with one or more base stations, such as gNB 101, 102, and 103. The mobile device may also be out of connection with the base stations with its access links but can transmit and receive data packets with another one or more other mobile stations or with one or more base stations through L2-based sidelink relay.

A remote UE 111 and gNB 103 forms an end-to-end path 181 through a L2-based sidelink relay with a relay UE 121. End-to-end path 181 includes an access link 135 between gNB 103 and relay UE 121 and a sidelink 171 between remote UE 111 and relay UE 121. In another embodiment, the sidelink relay is the L2-based or L3-based UE-to-Network multi-hop relay using sidelink is configured. A remote UE 112 and gNB 102 forms an end-to-end path 182 through a L2-based or a L3-based sidelink relay with a relay UE 122 and another relay UE 123. End-to-end path 182 includes an access link 136 between gNB 102 and relay UE 122, sidelink 172 between relay UE 122 and relay UE 123, and sidelink 173 between remote UE 112 and relay UE 123. In yet another embodiment, a relay mobile device is configured with multiple remote mobile devices or multiple end node mobile devices. A relay UE 128, with an access link 137 to gNB 101 is configured with two remote UEs 117 and 118 through sidelink 175 and 176, respectively. In other embodiments, a relay mobile device can be configured for multiple UE-to-UE relay paths. Different links are established for the illustrated relay paths. An access link is a link between a base station, such as gNB and a mobile device, such as a UE. The UE can be a remote UE or a relay UE. The access link includes both the uplink (UL) and the downlink (DL) between the base station and the mobile device. The interface for the access link is an NR Uu interface. In one embodiment, the remote UE also establishes access link with a base station. A side link is a link between two mobile devices and uses PC5 interface. The sidelink can be a link between a remote UE/end-node UE and a relay UE or a link between two relay mobile devices/UEs for the multi-hop relay. The end-to-end link for a relay path can be a link between two end-node mobile devices for a UE-to-UE relay or a base station to mobile device for a UE-to-Network relay. An Xn link is the backhaul link between two base stations, such gNBs using the Xn interface. In one embodiment, candidate relay UE information is transmitted to the base station via the Xn link.

FIG. 1 further illustrates simplified block diagrams of a base station and a mobile device/UE for adaptation handling for L2-based sidelink relay. gNB 103 has an antenna 156, which transmits and receives radio signals. An RF transceiver circuit 153, coupled with the antenna, receives RF signals from antenna 156, converts them to baseband signals, and sends them to processor 152. RF transceiver 153 also converts received baseband signals from processor 152, converts them to RF signals, and sends out to antenna 156. Processor 152 processes the received baseband signals and invokes different functional modules to perform features in gNB 103. Memory 151 stores program instructions and data 154 to control the operations of gNB 103. gNB 103 also includes a set of control modules 155 that carry out functional tasks to communicate with mobile stations.

FIG. 1 also includes simplified block diagrams of a UE, such as relay UE 121, or remote UE 111. The UE has an antenna 165, which transmits and receives radio signals. An RF transceiver circuit 163, coupled with the antenna, receives RF signals from antenna 165, converts them to baseband signals, and sends them to processor 162. In one embodiment, the RF transceiver may comprise two RF modules (not shown). A first RF module is used for HF transmitting and receiving, and the other RF module is used for different frequency bands transmitting and receiving which is different from the HF transceiver. RF transceiver 163 also converts received baseband signals from processor 162, converts them to RF signals, and sends out to antenna 165. Processor 162 processes the received baseband signals and invokes different functional modules to perform features in the UE. Memory 161 stores program instructions and data 164 to control the operations of the UE. Antenna 165 sends uplink transmission and receives downlink transmissions to/from antenna 156 of gNB 103.

The UE also includes a set of control modules that carry out functional tasks. These control modules can be implemented by circuits, software, firmware, or a combination of them. A request receiving handler 191 receives a request to establish a sidelink (SL) relay path in a new radio (NR) network, wherein the sidelink relay path includes the UE as a relay node for two end nodes. A command handler 192 sends one or more sidelink relay channel establishment commands to one or more UEs to establish one or more corresponding sidelink relay channels for the sidelink relay path. A relay path handler 193 activates an end-to-end sidelink relay channel for the sidelink relay path upon completion of one or more sidelink relay channel establishments. A data routing handler 194 routes sidelink relay data packets between the two end nodes through the end-to-end relay channel.

Figure 2:
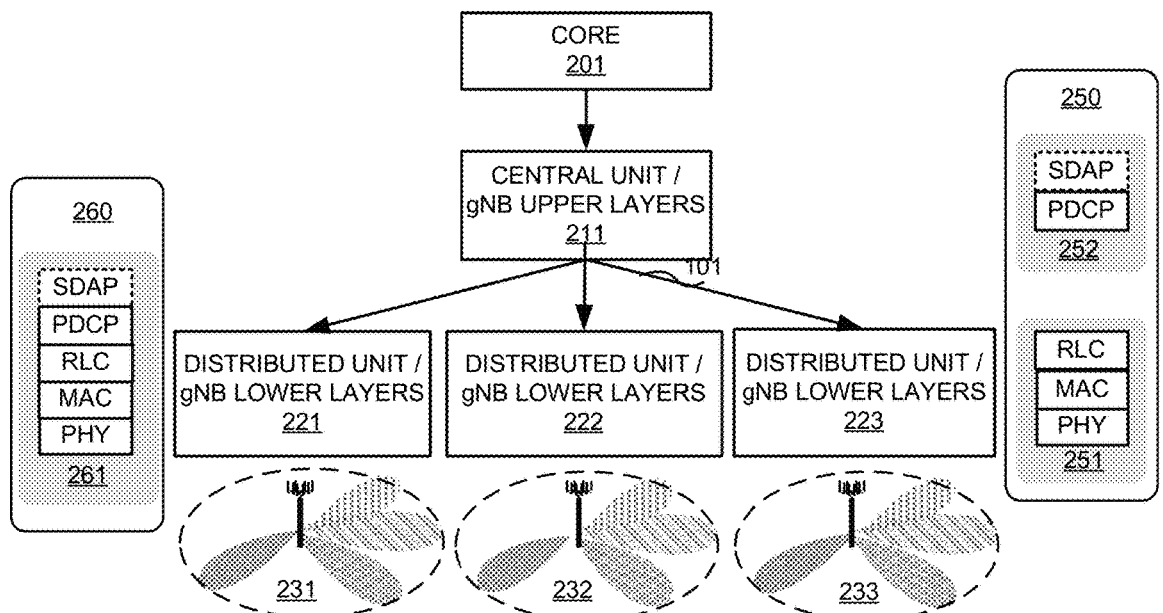
FIG. 2 illustrates an exemplary NR wireless system with centralized upper layers of the NR radio interface stacks in accordance with embodiments of the current invention.

FIG. 2 illustrates an exemplary NR wireless system with centralized upper layers of the NR radio interface stacks in accordance with embodiments of the current invention. Different protocol split options between central unit (CU) and distributed unit (DU) of gNB nodes may be possible. The functional split between the CU and DU of gNB nodes may depend on the transport layer. Low performance transport between the CU and DU of gNB nodes can enable the higher protocol layers of the NR radio stacks to be supported in the CU, since the higher protocol layers have lower performance requirements on the transport layer in terms of bandwidth, delay, synchronization and jitter. In one embodiment, SDAP and PDCP layer are located in the CU, while RLC, MAC and PHY layers are located in the DU. A core unit 201 is connected with one central unit 211 with gNB upper layer 252. In one embodiment 250, gNB upper layer 252 includes the PDCP layer and optionally the SDAP layer. Central unit 211 is connected with distributed units 221, 222, and 221. Distributed units 221, 222, and 223 each corresponds to a cell 231, 232, and 233, respectively. The DUs, such as 221, 222 and 223 includes gNB lower layers 251. In one embodiment, gNB lower layers 251 include the PHY, MAC and the RLC layers. In another embodiment 260, each gNB has the protocol stacks 261 including SDAP, PDCP, RLC, MAC and PHY layers.

Figure 3A:
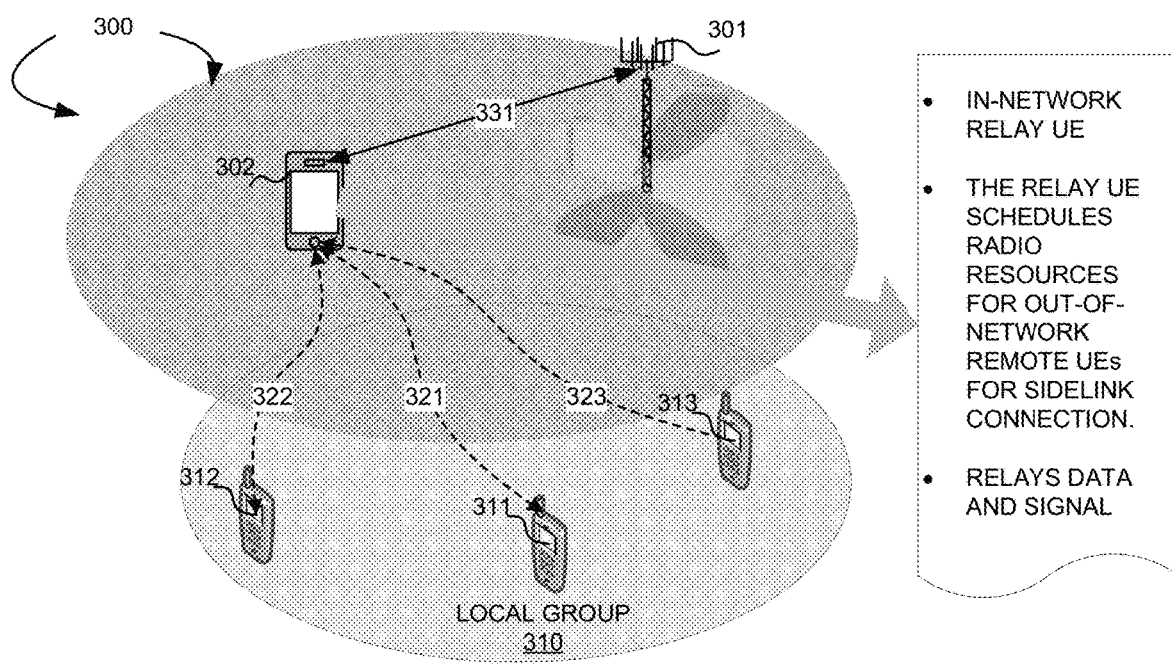
FIG. 3A illustrates an exemplary NR UE-to-Network relay network with the relay connected with the network in accordance with embodiments of the current invention.

FIG. 3A illustrates an exemplary NR UE-to-Network relay network with the relay connected with the network in accordance with embodiments of the current invention. The NR network 300 has a gNB 301, a relay UE 302, and remote UEs 311, 312, and 313. Relay UE 302 is connected with the network through a Uu interface with uplink (UL) and downlink (DL) 331. In one embodiment, the out-of-coverage UEs, such as UEs 311, 312, and 313 form a local group 310. Relay UE 302 schedules the radio resources for the group of remote UEs, such as UE 311, UE 312, and UE 313 according to the network configuration. Relay UE 302 can relay data and signaling among the device members of the local group 310, out of the network coverage. There is an NR Uu air interface between gNB 301 and relay UE 302. The relay UE operates as a layer-2 relay or a layer-3 relay. There is PC5 interface, such a s sidelinks 321, 322, and 323, between relay UE 302 and each remote UE, such as UEs 311, 312, and 313, respectively.

Figure 3B:
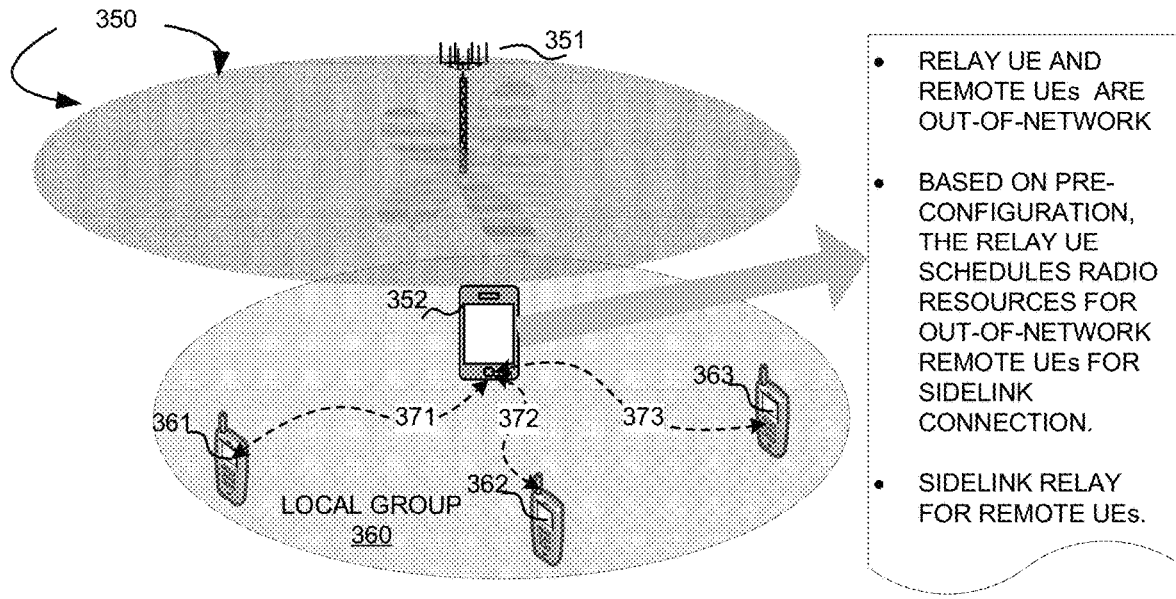
FIG. 3B illustrates an exemplary NR UE-to-Network relay network with the relay out of the network in accordance with embodiments of the current invention.

FIG. 3B illustrates an exemplary NR UE-to-Network relay network with the relay out of the network in accordance with embodiments of the current invention. The NR network 350 has a gNB 351, a relay UE 352, and remote UEs 361, 362, and 363. At the time of the establishing the sidelink relay path for the remote UEs, the relay UE and the remote UEs are out-of-coverage. In one embodiment, relay UE 352 acquires the network configuration for the sidelink relay according to its previously connection with the network. In another embodiment, relay UE 352 obtains network configuration for the sidelink relay based on its pre-configuration. Out-of-coverage remote UEs, such as UEs 361, 362, and 363, forms a local group 360. Relay UE 352 schedules the radio resources for remote UEs in local group 360. Relay UE can relay data and signaling among the device members of the local group 360, out of the network coverage. In one embodiment, relay UE 352 performs L2 sidelink relay or L3 sidelink relay through sidelinks 371, 372, and 373 with remote UEs 361, 362, and 363, respectively.

In one novel aspect, the relay UE established sidelink relay channels upon receiving sidelink relay connection request. In one embodiment, the request comes from the base station/gNB for the in-network relay UE. In another embodiment, the request comes from a remote UE requesting the service for the out-of-network relay UE. The relay UE performs the traffic relay between the two end nodes of the sidelink replay path at the L2 or at L3.

Figure 4:
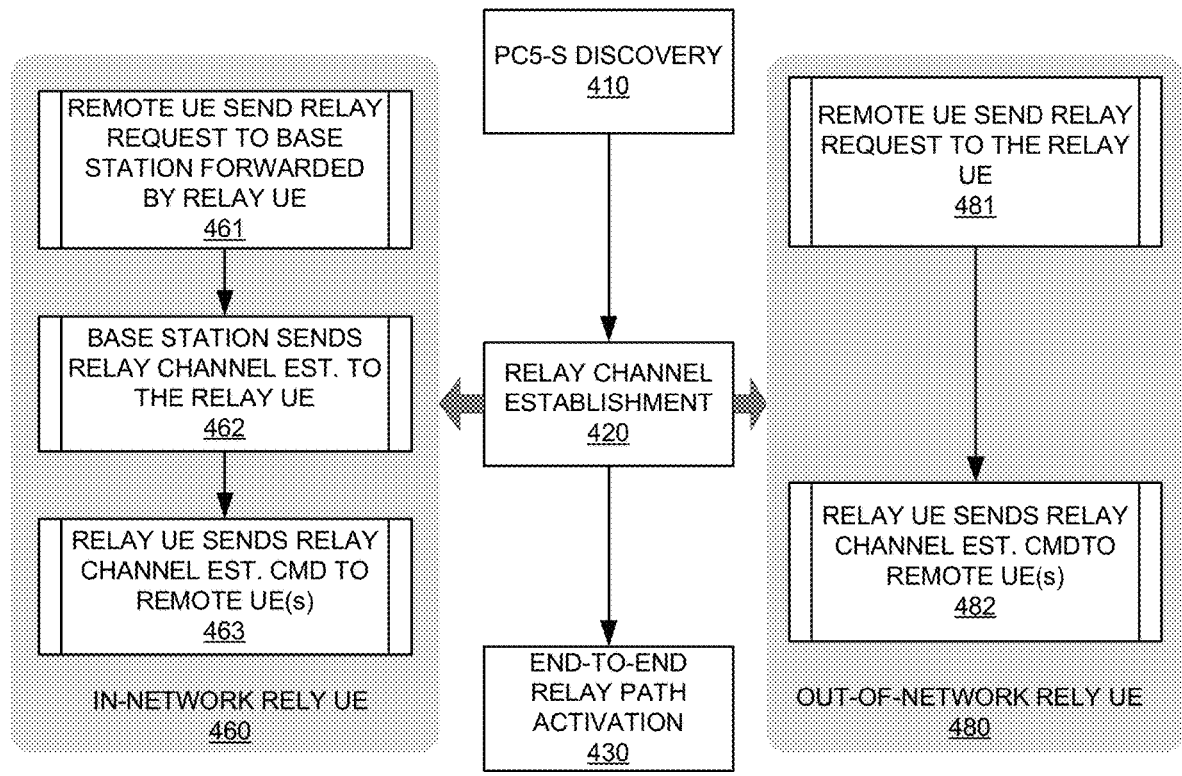
FIG. 4 illustrates an exemplary top level sidelink relay channel establishment for in-network relay UE and out-of-network relay UE in accordance with embodiment of the current invention.

FIG. 4 illustrates an exemplary top level sidelink relay channel establishment for in-network relay UE and out-of-network relay UE in accordance with embodiment of the current invention. At step 410, the relay UE and the one or two remote UEs performs PC5 signal (PC5-S) discovery. For the UE-to-network relay, the relay UE and the remote UE establishes the PC5-S link. For UE-to-UE relay, the relay UE establishes two PC5-S links with each remote UE. In other embodiments of multi-hop sidelink relay, the relay UE establishes PC5-S link with its immediate one or more of its relay UE nodes and/or the remote UE. At step 420, the relay UE establishes relay channels for the sidelink relay. At step 430, the end-to-end relay path is activated upon the successful establishments of the relay channels. In one embodiment, the relay UE is an in-network relay UE connected with the gNB of the NR network. For step 420, relay UE follows procedure 460 for in-network relay UE. At step 461, the remote UE sends the relay request to the base station through the relay UE with the established PC5-S link. At step 462, the base station/gNB sends the Relay Channel Establishment Command/request to the relay UE. At step 463, the relay UE sends the Relay Channel Establishment Command to the one or two remote UEs. In another embodiment, the relay UE is an out-of-network relay UE. For step 420, the relay UE follows procedure 480 for the out-of-network relay UE. At step 481, the remote UE sends the relay request to the relay UE. At step 482, the relay UE sends the Relay Channel Establishment Command to one or more remote UEs.

Figure 5:
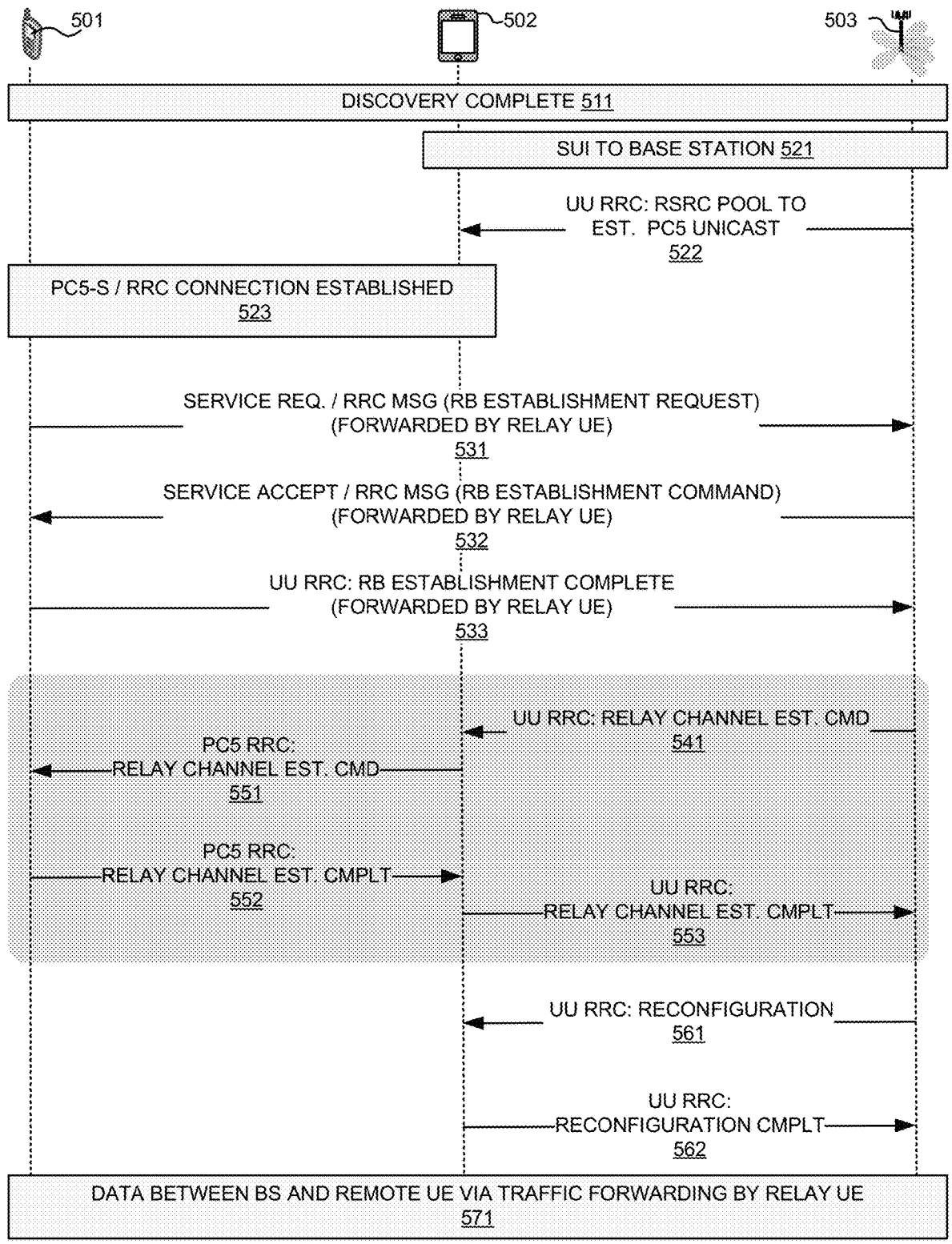
FIG. 5 illustrates exemplary flow diagrams for a L2-based sidelink relay channel establishment with the in-network relay UE in accordance with embodiments of the current invention.

FIG. 5 illustrates exemplary flow diagrams for a L2-based sidelink relay channel establishment with the in-network relay UE in accordance with embodiments of the current invention. The NR network has a gNB 503, a remote UE 501, and a relay UE 502. At step 511, the discovery is completed for both remote UE 501 and relay UE 502. At step 521, relay UE 502 sends the RRC message of Sidelink UE Information (SUI) to gNB 503 including the relay UE ID, the remote UE ID, and the resource request for both TX and RX to establish the unicast link with remote UE 501. Optionally, the PC5 link quality for the relay UE-remote UE pair can also be included in SUI. The remote UE ID and relay UE ID can be the L2 UE ID as defined by 3GPP TS 23.003. The SUI report clearly describes the pair of remote UE-relay UE, the role of both UEs and the identities of both UEs. In one embodiment, relay UE 502 reports the remote UE capability including the supported frequency list and/or the relay UE capability to gNB 503 in order to get the appropriate resources for the follow-up relaying operation between remote 501 and gNB 503. At step 522, gNB 503 sends relay UE 502 the RRC message including the resource configuration to allow Relay UE to establish unicast link with Remote UE. Alternatively, the preconfigured or previously configured resource pool can be used. At step 523, the PC5 link between relay UE 502 and remote UE 501 is established based on the network configured resource. During or after the PC5 link establishment (governed by PC5-S), relay UE may use AS layer procedure to indicate the received resource configuration to remote UE 501. RRC connection between relay UE 502 and remote UE 501 is established following the establishment of PC5 link.

At step 531, remote UE 501 sends a NAS message of service request to gNB 503, forwarded by relay UE 502 as an RRC message. The service request from remote UE 501 is a request to establish the necessary QoS flow to support the communication between remote UE 501 and gNB 503. At step 532, the 5GC of the NR network through gNB 503 sends a NAS message to remote UE 501, forwarded by relay UE 502 as an RRC message. The service accept message is an acknowledgement from the network to the service request and a command to remote UE 501 to establish necessary QoS flow between remote UE and gNB. In order to support Layer 2 relay operation, the RB establishment command includes the necessary configuration to establish the end-to-end QoS flow between remote UE and gNB. Assuming the Layer-2 Relay works at RLC layer for relaying, the configuration within the RB establishment command includes one or more elements of SDAP configuration, PDCP configuration including security key, end-to-end RB ID, and QoS information for each radio bearer to be established. One Radio bearer may be established to carry multiple QoS flows. If remote UE 501 did not initiate the initial registration before the service request message, the initial registration before the service request message, the initial registration procedure needs to apply before service request message. Security and/or authentication procedure may occur between UE and network after step 532 and before step 533. At step 533, when remote UE 501 establishes QoS flow with the indicated configuration, an RRC message including establishment complete is sent to gNB 503, forwarded by relay UE 502.

At step 541, gNB 503 sends a Uu RRC message (e.g. RRC Reconfiguration) including Relay Channel Establishment Command to relay UE 502 to configure sidelink relay channel with the intention to establish the necessary relaying channel(s) to perform relaying between remote UE 501 and gNB 503. gNB 503 configures the resource pool in either mode A or mode B for both relay UE 502 and remote UE 502 to reconfigure the PC5 unicast link for relaying. If relay UE 502 and remote UE 501 are scheduled by mode B, the aligned resource pool for sensing for the UE pairs needs to be provided via the configuration. The relay channel configurations for the PC5 link between remote UE 501 and relay UE 502 includes the configuration for one or multiple relay channels. The configuration for each relay channel includes the information elements within SL-RLC-Bearer-Config. Specifically, the configuration for each relay channel includes one or more elements of the associated end-to-end Uu Radio Bearer index(es) (e.g. ServedRadioBearer), RLC layer index (e.g. sl-RLC-BearerConfigIndex), RLC configuration (e.g. sl-RLC-Config), MAC-logical channel configuration (e.g. sl-MAC-LogicalChannelConfig), Sidelink logical channel ID, Relay channel ID, and the QoS profile of the QoS flow(s) within each associated end-to-end Uu radio bearer. The associated end-to-end Uu radio bearer for each relay channel included within each relay channel configuration can be one end-to-end Uu radio bearer, or a list of end-to-end radio bearer IDs. The end-to-end configuration indicates to relay UE 502 the RLC channel to carry a particular end-to-end radio bearer. Relay UE 502 applies this information during bearer mapping. In addition, the QoS profile of the QoS flow(s) within each end-to-end Uu radio bearer subject to relaying is notified to relay UE 502 by gNB 503 in order to allow the relay UE to perform transmission prioritization for next-hop transmission. Relay channel for Layer-2 relay is configured as RLC channel when the Layer-2 relay UE forwards the traffic at RLC layer or an adaptation layer between RLC and PDCP layer. In one embodiment, the relay channel configuration further includes the Uu radio bearer configuration between relay UE 502 and gNB 503. In another embodiment, relay UE 502 performs L2 relay at the MAC layer. The relay channel configurations for the PC5 link between remote UE 501 and relay UE 502 includes one or more elements of the configuration for MAC-logical channel configuration (e.g. sl-MAC-LogicalChannelConfig), Sidelink logical channel ID, Relay channel ID. In yet another embodiment, relay UE 502 performs L2 relay at an adaptation layer. The relay channel configurations for the PC5 link between remote UE 501 and relay UE 502 includes one or more elements of the configuration for MAC-logical channel configuration (e.g. sl-MAC-LogicalChannelConfig), Sidelink logical channel ID, Relay channel ID, and adaptation layer configuration. In one embodiment, to identify the relay channel over direct link PC5, the logical channel ID is used as Relay channel ID. Relay UE 502 assigns one or more specific logical channels over PC5 for relaying purpose. Alternatively, a specific relay channel ID is defined with one-to-one mapping between logical channel ID and PC5 relay channel ID.

At step 551, relay UE 502 applies the relay channel configuration and sends a PC5 RRC message including Relay channel establishment command to remote 501 to establish the PC5 Relay channel for relaying. The Relay channel Establishment Command includes one or a list of relay channel configuration. Each relay channel configuration includes one or more elements of the associated end-to-end Uu Radio Bearer index(es) (e.g. ServedRadioBearer), RLC layer index (e.g. sl-RLC-BearerConfigIndex), RLC configuration (e.g. sl-RLC-Config), MAC-logical channel configuration (e.g. sl-MAC-LogicalChannelConfig), Sidelink logical channel ID, Relay channel ID, and the QoS profile of the QoS flow(s) within each associated end-to-end Uu radio bearer. The RLC configuration includes the RLC mode, SN length, etc. Optionally, Relay UE ID is also included Relay Channel Establishment Command to indicate that the Relay Channel is established for a pair of remote UE and relay UE specific to one PC5 link. In one embodiment, in order to schedule the remote UE to use the specific radio resources for sidelink communication, the resource pool (mode A or mode B), and/or configured grant can be included in the Relay Channel Establishment Command. In one embodiment, the list of end-to-end Radio bearer IDs is included for each relay channel within each relay channel configuration. This tells the remote UE to use which RLC channel to carry a particular end-to-end radio bearer. At step 552, remote UE 501 acknowledges relay UE 502 via a PC5 RRC message of Relay Channel Establishment complete message. In one embodiment, at step 553, relay UE 502 responds a Sidelink Configuration Complete, such as in RRC Reconfiguration complete, as an acknowledgement of the relay channel configuration provided at step 541. In one embodiment, when step 541 provides Uu radio bearer configuration between relay UE 502 and gNB 503, the Relay Channel Establishment Complete message at step 553 further includes feedbacks for the completion of the radio bearer reconfiguration.

At step 561, gNB 503 sends RRC message of a RRC Reconfiguration, such as adding additional DRB to relay UE 502 to reconfiguration the Uu radio bearer to carry the relay traffic. At step 562, relay UE acknowledges gNB 503 RRC message i.e., RRC Reconfiguration complete to Relay UE indicate the complete of the RRC reconfiguration. At step 571, relay UE 502 transparently forwards traffic between remote UE 501 and gNB 503.

Remote UE 501 maintains the mapping relation between end-to-end Uu radio bearer ID and relay channel ID. Relay UE 502 maintains the mapping relation between Uu radio bearer ID of mapped radio bearer between gNB 503 and relay UE 502 for relaying and relay channel ID. In one embodiment, relay UE 502 maintains the mapping relation among ID of end-to-end radio bearer between gNB 503 and remote UE 501, ID of Uu radio bearer of mapped radio bearer between gNB 503 and relay UE 502 for relaying, and relay channel ID. gNB 503 maintains the mapping relation between Uu radio bearer ID of mapped radio bearer for relaying (with Relay UE) and Uu radio bearer ID of end-to-end radio bearers (with Remote UE). To identify the radio bearer for different remote UEs, relay UE 502 uses a combination of Remote UE ID, Uu Radio Bearer ID of mapped radio bearer for relaying and Uu Bearer ID of end-to-end radio bearers. In addition, the QoS flow to radio bearer mapping is performed at SDAP of gNB 503 and each remote UE.

Figure 6:
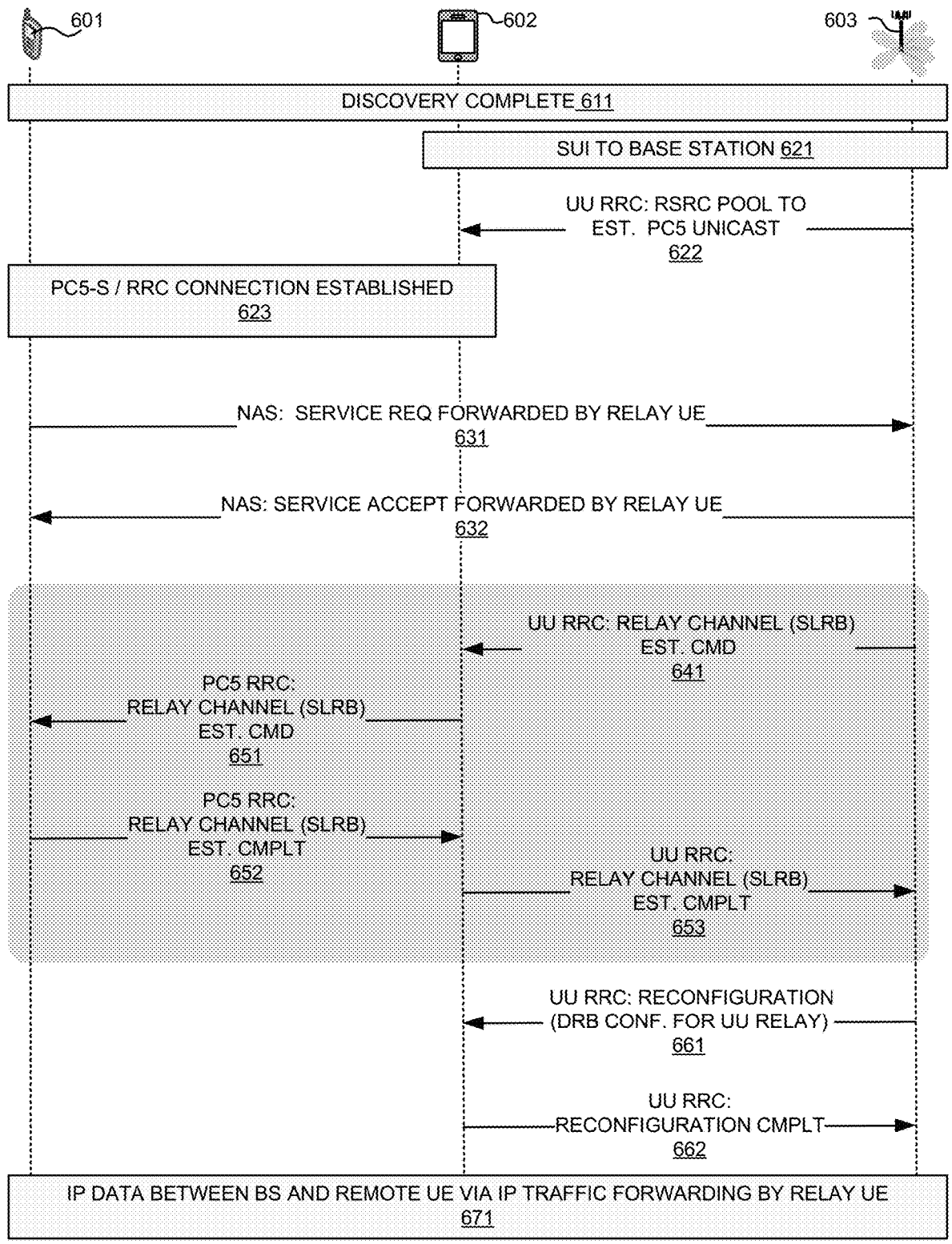
FIG. 6 illustrates exemplary flow diagrams for a L3-based sidelink relay channel establishment with the in-network relay UE in accordance with embodiments of the current invention.

FIG. 6 illustrates exemplary flow diagrams for a L3-based sidelink relay channel establishment with the in-network relay UE in accordance with embodiments of the current invention. The NR network has a gNB 603, a remote UE 601, and a relay UE 602. At step 611, the discovery is completed for both remote UE 601 and relay UE 602. At step 621, relay UE 602 sends the RRC message of Sidelink UE Information (SUI) to gNB 603 including the Relay UE ID, the Remote UE ID, and the resource request for both TX and RX to establish the unicast link with remote UE 601. Optionally, the PC5 link quality for the Relay UE-Remote UE pair can also be included in SUI. The remote UE ID and relay UE ID can be the L2 UE ID as defined by 3GPP TS 23.003. The SUI report clearly describes the pair of remote UE-relay UE, the role of both UEs and the identities of both UEs. In one embodiment, relay UE 602 reports the remote UE capability including the supported frequency list and/or the relay UE capability to gNB 603 in order to get the appropriate resources for the follow-up relaying operation between remote 601 and gNB 603. At step 622, gNB 603 sends relay UE 602 the RRC message including the resource configuration to allow relay UE to establish unicast link with remote UE. Alternatively, the preconfigured or previously configured resource pool can be used. At step 623, the PC5 link between relay UE 602 and remote UE 601 is established based on the gNB configured resource. During or after the PC5 link establishment (governed by PC5-S), relay UE may use AS layer procedure to indicate the received resource configuration to remote UE 601. RRC connection between relay UE 602 and remote UE 601 is established following the establishment of PC5 link.

At step 631, remote UE 601 sends NAS message (i.e. service request) encapsulated in PC5 RRC as NAS PDU to relay UE 602. Relay UE 602 resolves the PC5 RRC message and forwards the NAS PDU as a Uu RRC message to the gNB 603 according to the appropriate indication in the received PC5 RRC message. The Service Request indicates a request from remote UE 601 to establish the necessary QoS flow to support the communication between remote UE 601 and gNB 603. At step 632, the network sends NAS message (i.e. service accept) to gNB 603, forwarded by relay UE 602 as a RRC message. The service accept message indicates an acknowledgement from the network for the service request. If remote UE 601 did not initiate initial registration before the service request message, the initial registration procedure needs to apply between steps 631 and 632. Security and/or authentication procedure is performed between steps 631 and 632.

At step 641, gNB 603 sends a Uu RRC message (e.g. RRC Reconfiguration) including Relay Channel Establishment Command to relay UE 602 to configure Sidelink Relay Channel (i.e. SLRB) with the intention to establish the necessary relay channel (i.e. SLRB) for sidelink relay. gNB 503 configures the resource pool in (either mode A or mode B) for both relay UE 602 and remote UE 601 to reconfigure the PC5 unicast link between relay UE 602 and remote UE 601 for relaying. If the relay UE 602 and remote UE 601 are scheduled by mode B, the aligned resource pool for sensing for the UE pairs needs to be provided via the configuration. The relay channel (i.e. SLRB) configurations for the PC5 link between Relay UE 602 and remote UE 601 includes configuration for one or multiple relay channel(s). Each relay channel (i.e. SLRB) configuration includes one or a list of SL-RadioBearerConfig, and/or one or a list of SL-RLC-BearerConfig. The SL-RadioBearerConfig includes one or more elements of SDAP configuration, PDCP configuration including security key, and SLRB index (or ID). The SL-RLC-BearerConfig includes one or more elements of the associated Sidelink Radio Bearer index (e.g. SL-ServedRadioBearer), RLC layer index (e.g. sl-RLC-BearerConfigIndex), RLC configuration (e.g. sl-RLC-Config), MAC-logical channel configuration (e.g. sl-MAC-LogicalChannelConfig), Sidelink logical channel ID, and the QoS profile of the QoS flow(s) within each associated end-to-end Uu radio bearer. In one embodiment, the configuration provided by gNB 603 further includes the Uu Radio Bearer configuration between relay UE and BS.

At step 651, relay UE 602 applies the relay channel (i.e. SLRB) configuration and sends a PC5 RRC message including Relay Channel Establishment Command to remote UE 601 to establish the PC5 Relay channel (i.e. SLRB) for relaying. The Relay Channel Establishment Command includes Relay channel (i.e. SLRB) configurations. One Radio bearer may be established to carry multiple QoS flows. Each Relay channel (i.e. SLRB) configuration includes one or a list of SL-RadioBearerConfig, and/or one or a list of SL-RLC-BearerConfig. The SL-RadioBearer-Config includes one or more elements of SDAP configuration, PDCP configuration with security key, SLRB index (or ID). The SL-RLC-BearerConfig includes one or more elements of the associated Sidelink Radio Bearer index (e.g. SL-ServedRadioBearer), RLC layer index (e.g. sl-RLC-BearerConfigIndex), RLC configuration (e.g. sl-RLC-Config), MAC-logical channel configuration (e.g. sl-MAC-LogicalChannelConfig), Sidelink logical channel ID, and the QoS profile of the QoS flow(s) within each associated end-to-end Uu radio bearer. Optionally, Relay UE ID is also included to indicate that the relay channel is established for a pair of UEs specific to one PC5 link. In one embodiment, to schedule the Remote UE to use the specific radio resources for Sidelink communication, the resource pool (mode A or mode B), and/or configured grant are included in the Relay channel establishment command. At step 652, remote UE acknowledges relay UE 602 via a PC5 RRC message including Relay Channel SLRB Establishment Complete message. In one embodiment, at step 653, relay UE 602 responds a Sidelink Configuration Complete (e.g. in RRC Reconfiguration complete) as an acknowledgement of the configuration to gNB 603. In one embodiment, when the configuration provided by BS at step 641 includes Uu Radio Bearer configuration between relay UE 602 and gNB 603 feedbacks the radio reconfigure completion indication is included at step 653.

At step 661, gNB 603 sends RRC message of RRC Reconfiguration, such as adding additional DRB, to relay UE 602 to reconfigure the Uu radio bearer to carry the relayed traffic. At step 662, relay UE 602 acknowledges gNB 603 via RRC message i.e. RRC Reconfiguration complete to indicate the complete of the reconfiguration. At step 671, relay UE 602 acknowledges gNB 603 via RRC message i.e. RRC Reconfiguration complete to Relay UE indicate the complete of the reconfiguration.

Figure 7:
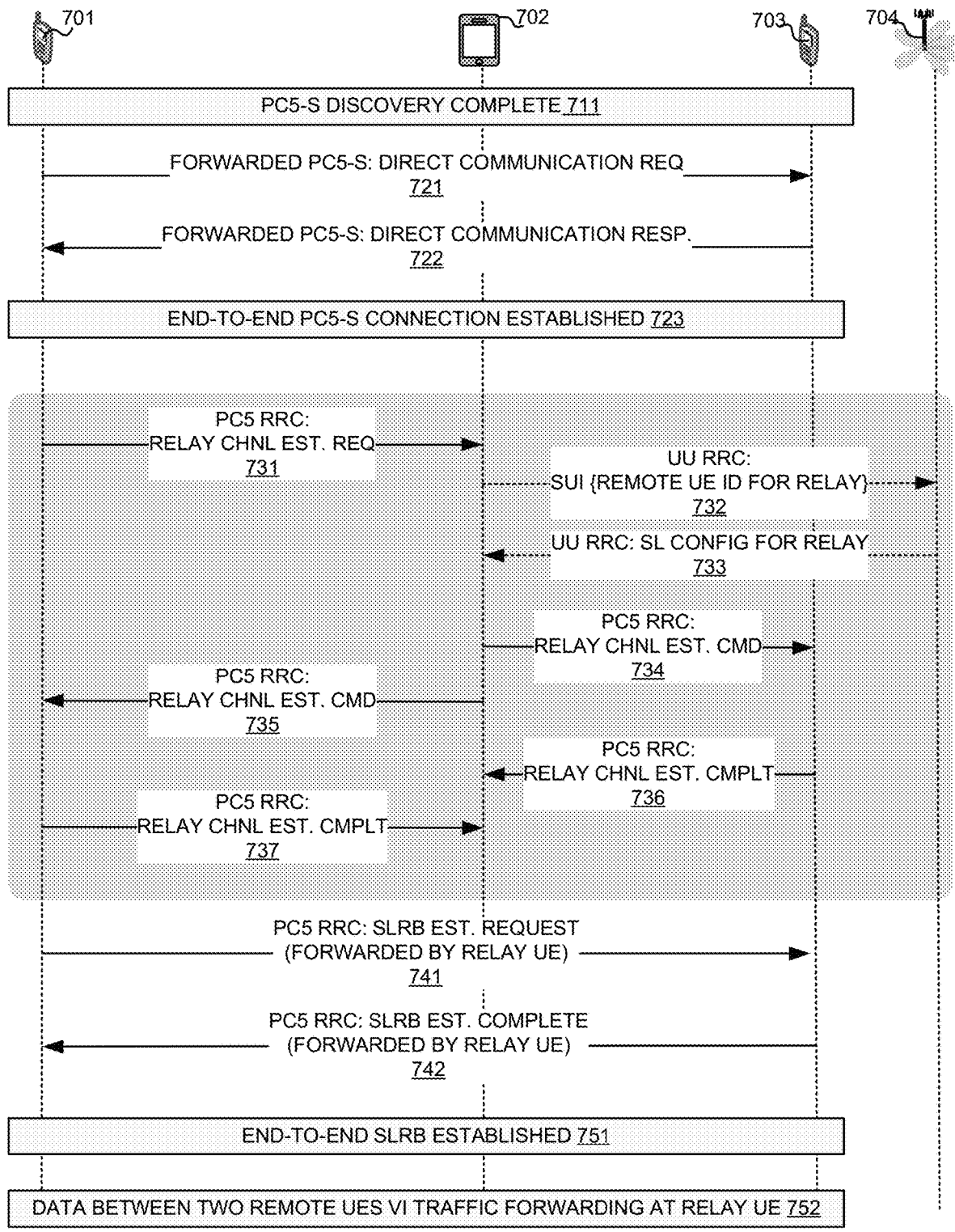
FIG. 7 illustrates exemplary flow diagrams for a L2-based sidelink relay channel establishment with the out-of-network relay UE in accordance with embodiments of the current invention.

FIG. 7 illustrates exemplary flow diagrams for a L2-based sidelink relay channel establishment with the out-of-network relay UE in accordance with embodiments of the current invention. The NR network has a gNB 704, remote UEs 701 and 703, and a relay UE 702. At step 711, direct PC5 unicast link is established between remote UE 701 and relay UE 702, and between remote UE 703 and relay UE 702 for a UE-to-UE sidelink relay, which is managed by PC5-S signaling. At step 721, remote UE 701 sends Direct Communication Request to remote UE 703. At step 722, remote UE 703 sends Direct Communication Response to remote UE 701. At step 723, direct PC5 unicast link is established between remote UE 701 and remote UE 703.

Remote UE 701 initiates a relay-based application. At step 731, remote UE 702 sends an RRC message of Relay Channel Establishment Request to relay UE 702 from AS layer. A PC5-S message of service request is encapsulated in the RRC message indicating the service request for a particular application based on relaying. At step 732, relay UE 702 sends the RRC message of Sidelink UE information (SUI) to the gNB 704 including Relay UE ID, Remote UE ID, and the resource request (both TX and RX) for establishing to request radio resources for relaying operation for both Relay UE and Remote UE. The Remote UE ID and Relay UE ID can be the Layer 2 UE ID as defined by 3GPP TS 23.003. The SUI report clearly describes the pair of Remote UE-Relay UE, the role of both UEs and the identities of both UEs. In one embodiment, relay UE 702 reports the remote UE capability including the supported frequency list and/or the relay UE capability to the gNB 704 to get the appropriate resources for the follow-up relaying operation between remote UEs. At step 733, gNB 704 sends the RRC message including Sidelink Configuration for Relaying to relay UE 702. The radio resource pool can be included. The resource configuration can be mode A based or mode B based. Alternatively, the preconfigured or previously configured resource pool can be used. In one embodiment, steps 732 and 733 are not performed when the relay UE 702 is the out-of-network relay UE. At steps 734 and 735, relay UE 702 applies the relay channel configuration and sends a PC5 RRC message including Relay Channel Establishment Command to remote UEs 701 and 703, respectively, to establish the corresponding PC5 relay channels for relaying. The same procedure of step 551 applies. The difference is that when the list of Radio bearer IDs is included for each Relay channel within each Relay channel configuration, the Radio bearer ID is SLRB ID. It indicates to the remote UE which RLC channel to use to carry a particular SLRB. Each relay channel configuration includes one or more elements of the associated end-to-end SLRB index(es) (e.g. ServedRadioBearer), RLC layer index (e.g. sl-RLC-BearerConfigIndex), RLC configuration (e.g. sl-RLC-Config), MAC-logical channel configuration (e.g. sl-MAC-LogicalChannelConfig), Sidelink logical channel ID, Relay channel ID, and the QoS profile of the QoS flow(s) within each associated end-to-end Uu radio bearer. The RLC configuration includes RLC mode, SN length, etc. At steps 736 and 737, remote UE 703 and remote UE 701 responds with a PC5 RRC message of the Relay Channel Establishment Complete message to relay UE 702, respectively.

At step 741, remote UE 701 sends PC5 RRC message (e.g. SLRB Establishment Command) to remote UE 703, which is forwarded by relay UE 702. SLRB Establishment Command includes the Radio bearer(s) or QoS flow(s) needs to be established to support the application subject to relaying. SLRB Establishment Request includes one or a list of SL-RadioBearerConfig, and/or one or a list of SL-RLC-BearerConfig. The SL-RadioBearerConfig includes one or more elements of SDAP configuration, PDCP configuration including security key, SLRB index (or ID) or any combination among them. The SL-RLC-BearerConfig includes the associated Sidelink Radio Bearer index (e.g. SL-ServedRadioBearer), RLC layer index (e.g. sl-RLC-BearerConfigIndex), RLC configuration (e.g. sl-RLC-Config), MAC-logical channel configuration (e.g. sl-MAC-LogicalChannelConfig), Sidelink logical channel ID, and the QoS profile of the QoS flow(s) within each associated end-to-end Uu radio bearer. At step 742, remote UE 703 responds with a PC5 RRC message of the SLRB Establishment Complete message forwarded by relay UE 702. At step 751, the end-to-end SLRB is established for remote UE 701 and remote UE 703. At step 752, relay UE 702 transparently forwards traffic between the end nodes remote UEs.

Remote UE 701 maintains the mapping relation between end-to-end Sidelink Radio Bearer (i.e. SLRB) ID and Relay channel ID for relay channel between remote UE 701 and relay UE 702. Remote UE 703 maintains the mapping relation between end-to-end Sidelink Radio Bearer (i.e. SLRB) ID and Relay channel ID for relay channel between remote UE 703 and relay UE 702. Relay UE 702 maintains the mapping relation between remote UE 701-relay UE 702 Relay channel ID and remote UE 703-relay UE 702 Relay channel ID. In one embodiment, relay UE 702 maintains the mapping relation among remote UE 701-relay UE 702 Relay channel ID and remote UE 703-relay UE 702 Relay channel ID, and end-to-end SLRB ID. In other embodiment, a combination of Remote UE ID(s), Relay Channel ID of ingress relay channel and egress relay channel is used. The QoS flow to radio bearer mapping is performed at SDAP of Remote UE1 and Remote UE2 following legacy procedure.

Figure 8:
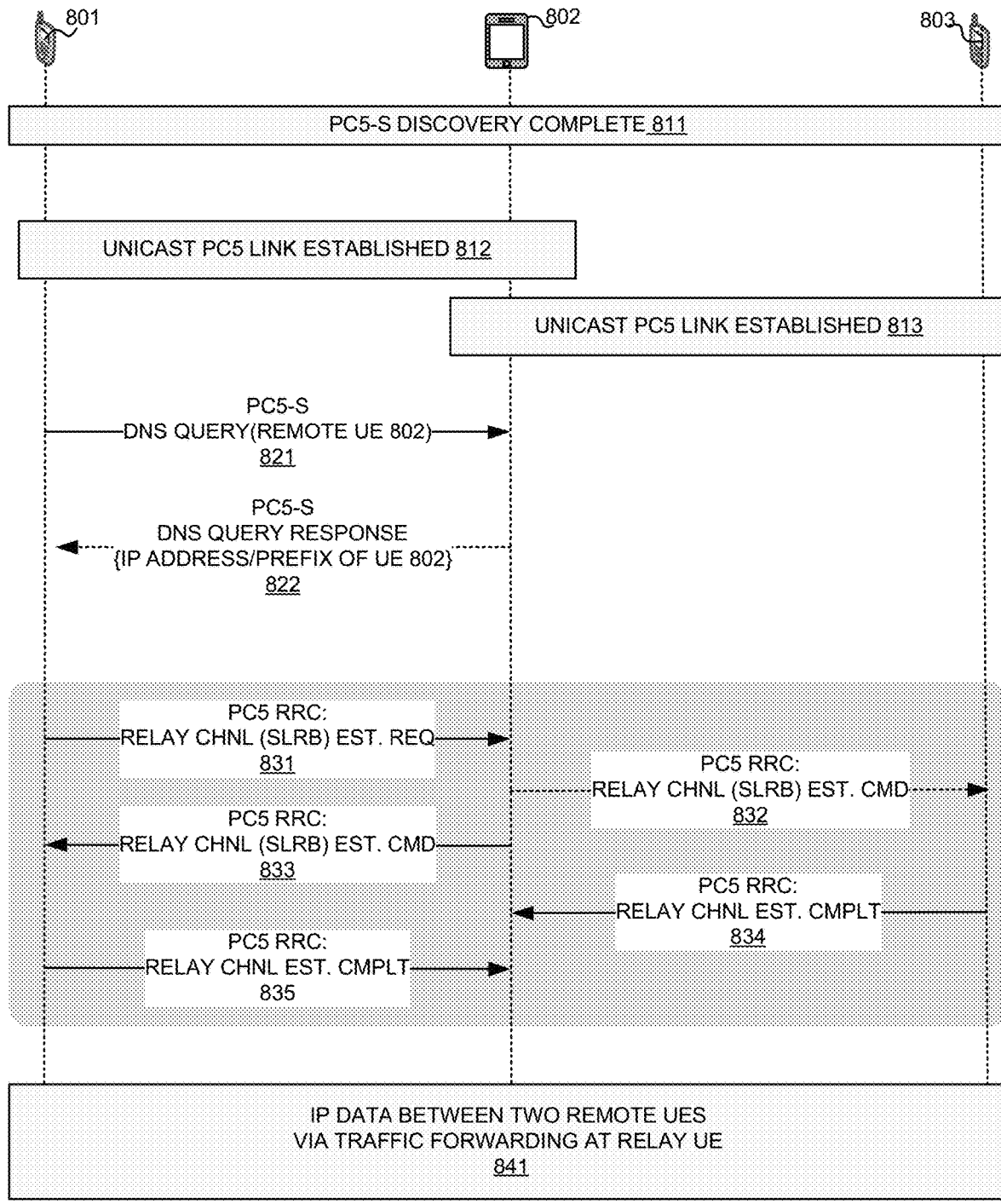
FIG. 8 illustrates exemplary flow diagrams for a L3-based sidelink relay channel establishment with the out-of-network relay UE in accordance with embodiments of the current invention.

FIG. 8 illustrates exemplary flow diagrams for a L3-based sidelink relay channel establishment with the out-of-network relay UE in accordance with embodiments of the current invention. The NR wireless network includes a remote UE 801, a relay UE 802, and a remote UE 803. At step 811, the PC5-S discovery for the remote UEs and the relay UE are completed. Any UE that wants to make use of the layer-3 UE-to-UE relay needs to establish a unicast L2 link with the UE-to-UE relay with IP configuration. The layer-3 UE-to-UE relay allocates IP address/prefix to remote UEs. At steps 812 and 813, the direct PC5 unicast link is established between remote UE 801 and relay UE 802, and between remote UE 803 and relay UE 802 for UE-to-UE based relaying, which is managed by PC5-S signaling. As part of the unicast L2 link establishment procedure, the relay UE 802 stores an association of the User Info of the peer UE of the unicast link and the IP address/prefix allocated to the UE into its domain name system (DNS) entries. The relay UE 802 acts as a DNS server to other UEs. At step 821, when remote UE 801 needs to communicate with remote UE 803 or needs to discover a ProSe service via the relay UE 802, remote UE 801 sends a DNS query for remote UE 803 or for the ProSe Service to relay UE 802 over the unicast link. At step 822, relay UE 802 returns the IP address/prefix of remote UE 803 or the ProSe Service to remote UE 801.

At step 831, remote UE 801 sends a RRC message: Relay channel establishment Request to relay UE 802 from AS layer perspective. A PC5-S message (e.g. service request) is encapsulated in this RRC message indicating the service request for a particular application based on relaying. Within this message, the required SLRB and/or corresponding QoS flow to support Layer-3 IP routing for the UE pair indicated by a pair of IP address/prefix is included. At step 832, relay UE 802 sends a PC5 RRC message or Relay Channel (SLRB) establishment Command to remote UE 803. At step 833, relay UE 802 sends a PC5 RRC message or Relay Channel (SLRB) establishment Command to remote UE 801. At step 834, remote UE 803 acknowledges with a PC5 RRC message of Relay Channel Establishment Complete message to relay UE 802. At step 835, remote UE 801 acknowledges with a PC5 RRC message of Relay Channel Establishment Complete message to relay UE 802. At step 841, relay UE 802 routes traffic between remote UE 801 and remote UE 803 as IP router. Relay UE 802 acts as an IP router, and forwards the packets to the corresponding unicast L2 link towards the target UE. Each of the unicast L2 link is treated as an IP interface.

In one embodiment, one or more SLRB is established between the remote UE 801 and relay UE 802 for traffic between remote UE 801 and remote UE 803. In order for relay UE 802 to perform transmission prioritization for received data flow for a particular SLRB e.g. the SLRB between remote UE 801 and relay UE 802, the end-to-end SLRB ID can be inserted into the packet header (i.e. IP header, SDAP header or PDCP header). Relay UE 802 knows the QoS information for the end-to-end SLRB. Relay UE 802 performs transmission prioritization e.g. at LCP of MAC for next hop transmission for data flow.

Figure 9:
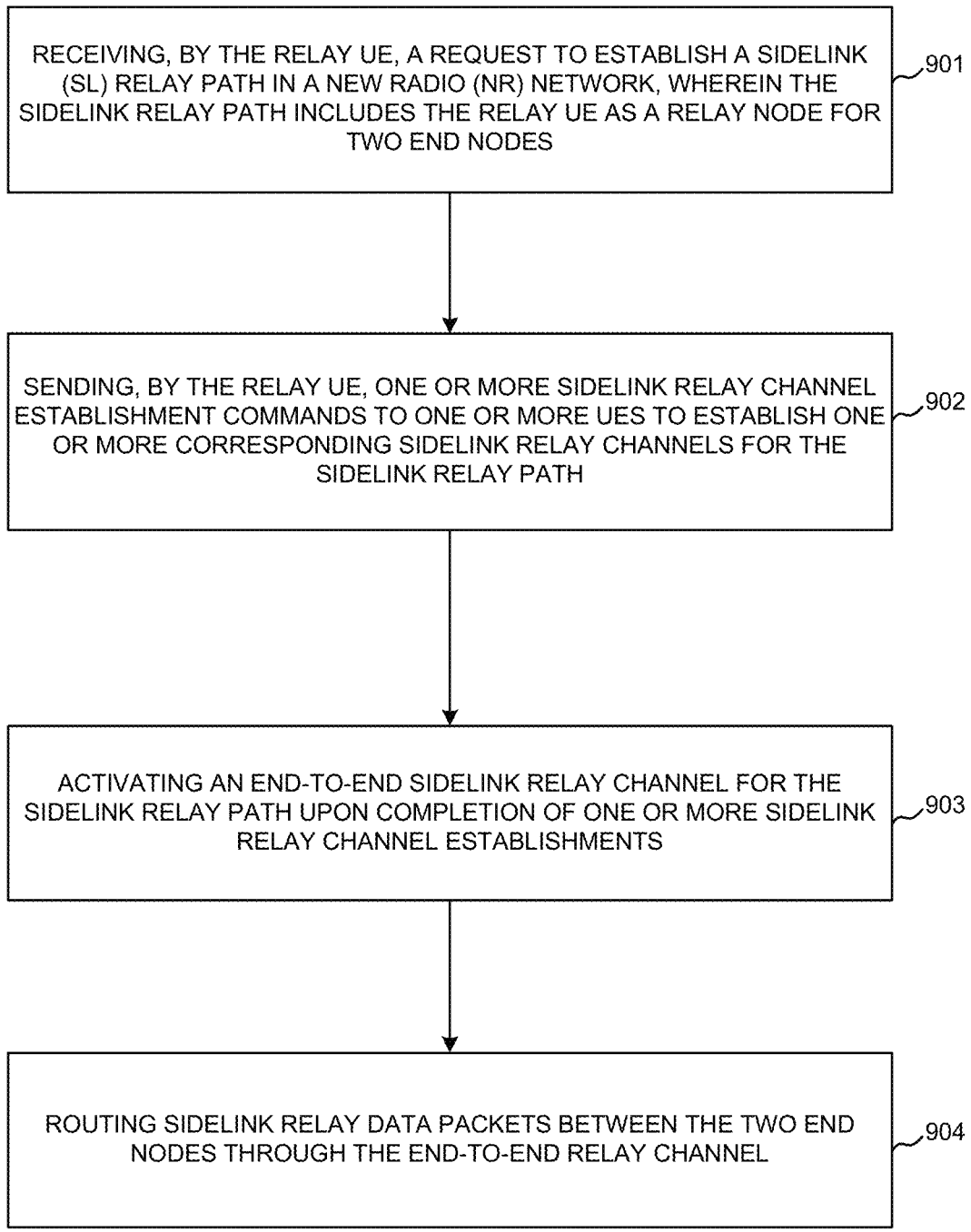
FIG. 9 illustrates an exemplary flow chart for the sidelink relay channel establishment in accordance with embodiments of the current invention.

FIG. 9 illustrates an exemplary flow chart for the sidelink relay channel establishment in accordance with embodiments of the current invention. At step 901, the relay UE receives a request to establish a sidelink (SL) relay path in a new radio (NR) network, wherein the sidelink relay path includes the relay UE as a relay node for two end nodes. At step 902, the relay UE sends one or more sidelink relay channel establishment commands to one or more UEs to establish one or more corresponding sidelink relay channels for the sidelink relay path. At step 903, the relay UE activates an end-to-end sidelink relay channel for the sidelink relay path upon completion of one or more sidelink relay channel establishments. At step 904, the relay UE routes sidelink relay data packets between the two end nodes through the end-to-end relay channel.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method for a relay user equipment (UE) comprising:
receiving, by the relay UE, a request from a base station to establish a sidelink (SL) relay path in a new radio (NR) network, wherein the sidelink relay path includes the relay UE as a relay node for two end nodes;
sending, by the relay UE, one or more sidelink relay channel establishment commands to one or more UEs to establish one or more corresponding sidelink relay channels for the sidelink relay path, wherein each sidelink relay channel establishment command is carried by a PC5 RRC message including one or more relay channel configurations for a PC5 link between an end node remote UE and the relay UE;
activating an end-to-end sidelink relay channel for the sidelink relay path upon completion of one or more sidelink relay channel establishments; and
routing sidelink relay data packets between the two end nodes through the end-to-end relay channel.

2. The method of claim 1, wherein the request to establish a sidelink relay path is a Uu radio resource control (RRC) message of Relay Channel establishment command from a gNB including a relay channel configuration of the sidelink relay path.

3. The method of claim 2, wherein the sidelink relay path is a layer-2 (L2) sidelink relay, and wherein the relay channel configuration includes one or more elements comprising an associated end-to-end Uu radio bearer index, a radio link control (RLC) index, a MAC-logic channel configuration, a sidelink logical channel identification (ID), a relay channel ID, a QoS profile of one or more QoS flows for each associated end-to-end Uu radio bearer.

4. The method of claim 2, wherein the sidelink relay path is a layer-3 (L3) sidelink relay, and wherein the relay channel configuration configures a relay channel sidelink radio bearer (SLRB) includes one or more elements comprising one or a list of SL-RadiobearerConfig, one or a list of SL-RLC-BearerConfig.

5. The method of claim 4, wherein the SL-RadioBearerConfig includes one or more elements comprising a service data adaptation protocol (SDAP) configuration, a packet data convergence protocol (PDCP) configuration with security key, an SLRB index, and an SLRB index.

6. The method of claim 4, wherein the SL-RLC-BearerConfig includes one or more elements comprising an associated SLRB index, an RLC layer index, an RLC configuration, a MAC-logical channel configuration, a Sidelink logical channel ID, and a QoS profile of one or more QoS flows within each associated end-to-end Uu radio bearer.

7. The method of claim 1, wherein the request to establish a sidelink relay path is a PC5 resource control (RRC) message of Relay Channel Establishment Request from a remote UE end node.

8. The method of claim 1, wherein the sidelink relay path is a layer-2 (L2) sidelink relay, and wherein the relay channel configuration includes one or more elements comprising an associated end-to-end Uu radio bearer index, a radio link control (RLC) index, a MAC-logic channel configuration, a sidelinklogical channel identification (ID), a relay channel ID, a QoS profile of one or more QoS flows for each associated end-to-end Uu radio bearer.

9. The method of claim 1, wherein the sidelink relay path is a layer-3 (L3) sidelink relay, and wherein the relay channel configuration configures a relay channel sidelink radio bearer (SLRB) includes one or more elements comprising one or a list of SL-RadiobearerConfig, one or a list of SL-RLC-BearerConfig.

10. A user equipment (UE), comprising:
a transceiver that transmits and receives radio frequency (RF) signal in a new radio (NR) wireless network;
a request receiving handler that receives a request from a base station to establish a sidelink (SL) relay path in a new radio (NR) network, wherein the sidelink relay path includes the UE as a relay node for two end nodes;
a command handler that sends one or more sidelink relay channel establishment commands to one or more UEs to establish one or more corresponding sidelink relay channels for the sidelink relay path, wherein each sidelink relay channel establishment command is carried by a PC5 RRC message including one or more relay channel configurations for a PC5 link between an end node remote UE and the relay UE;
a relay path handler that activates an end-to-end sidelink relay channel for the sidelink relay path upon completion of one or more sidelink relay channel establishments; and
a data routing handler that routes sidelink relay data packets between the two end nodes through the end-to-end relay channel.

11. The UE of claim 10, wherein the request to establish a sidelink relay path is a Uu radio resource control (RRC) message of Relay Channel establishment command from a gNB including a relay channel configuration of the sidelink relay path.

12. The UE of claim 11, wherein the sidelink relay path is a layer-2 (L2) sidelink relay, and wherein the relay channel configuration includes one or more elements comprising an associated end-to-end Uu radio bearer index, a radio link control (RLC) index, a MAC-logic channel configuration, a sidelink logical channel identification (ID), a relay channel ID, a QoS profile of one or more QoS flows for each associated end-to-end Uu radio bearer.

13. The UE of claim 11, wherein the sidelink relay path is a layer-3 (L3) sidelink relay, and wherein the relay channel configuration configures a relay channel sidelink radio bearer (SLRB) includes one or more elements comprising one or a list of SL-RadiobearerConfig, one or a list of SL-RLC-BearerConfig.

14. The UE of claim 13, wherein the SL-RadioBearer-Config includes one or more elements comprising a service data adaptation protocol (SDAP) configuration, a packet data convergence protocol (PDCP) configuration with security key, an SLRB index, and an SLRB index.

15. The UE of claim 13, wherein the SL-RLC-Bearer-Config includes one or more elements comprising an associated SLRB index, an RLC layer index, an RLC configuration, a MAC-logical channel configuration, a Sidelink logical channel ID, and a QoS profile of one or more QoS flows within each associated end-to-end Uu radio bearer.

16. The UE of claim 10, wherein the request to establish a sidelink relay path is a PC5 resource control (RRC) message of Relay Channel Establishment Request from a remote UE end node.

17. The UE of claim 10, wherein the sidelink relay path is a layer-2 (L2) sidelink relay, and wherein the relay channel configuration includes one or more elements comprising an associated end-to-end Uu radio bearer index, a radio link control (RLC) index, a MAC-logic channel configuration, a sidelink logical channel identification (ID), a relay channel ID, a QoS profile of one or more QoS flows for each associated end-to-end Uu radio bearer.

18. The UE of claim 10, wherein the sidelink relay path is a layer-3 (L3) sidelink relay, and wherein the relay channel configuration configures a relay channel sidelink radio bearer (SLRB) includes one or more elements comprising one or a list of SL-RadiobearerConfig, one or a list of SL-RLC-BearerConfig.

* * * * *